US010416990B2

United States Patent
Sahu et al.

(10) Patent No.: US 10,416,990 B2
(45) Date of Patent: Sep. 17, 2019

(54) SYSTEM AND METHOD FOR SEAMLESSLY PATCHING SHARED LIBRARIES IN SERVER ENVIRONMENT

(71) Applicant: Infosys Limited, Bangalore (IN)

(72) Inventors: Rana Prasad Sahu, Bangalore (IN); Rangarajan Kannan, Bangalore (IN); Manoj Kumar Agrawal, Bhubaneswar (IN); Deepak Narayan Hoshing, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 16/019,154

(22) Filed: Jun. 26, 2018

(65) Prior Publication Data

US 2019/0243636 A1 Aug. 8, 2019

(30) Foreign Application Priority Data

Feb. 5, 2018 (IN) .............................. 201841004315

(51) Int. Cl.
*G06F 9/44* (2018.01)
*G06F 8/656* (2018.01)

(52) U.S. Cl.
CPC .................. *G06F 8/656* (2018.02)

(58) Field of Classification Search
CPC .......... G06F 8/656; G06F 8/60; G06F 16/951; H04L 67/34
USPC ........................................................ 717/172
See application file for complete search history.

(56) References Cited

U.S. PATENT DOCUMENTS

| 6,957,422 | B2 * | 10/2005 | Hunt ....................... G06F 8/443 714/E11.209 |
| 7,555,751 | B1 | 6/2009 | Abbavaram et al. |
| 7,752,616 | B2 * | 7/2010 | Marolia .................... G06F 8/65 717/169 |
| 7,784,044 | B2 | 8/2010 | Buban et al. |
| 2003/0023964 | A1 * | 1/2003 | Rajaram ............. G06F 9/44521 717/172 |
| 2004/0107416 | A1 * | 6/2004 | Buban ..................... G06F 8/658 717/170 |

(Continued)

FOREIGN PATENT DOCUMENTS

| EP | 2071453 A1 | 6/2009 |
| WO | 2016068845 A1 | 5/2016 |

OTHER PUBLICATIONS

Title: Rethinking the library OS from the top down; author: De Porter et al ; published on 2011.*

*Primary Examiner* — Chameli Das
(74) *Attorney, Agent, or Firm* — Pepper Hamilton LLP

(57) ABSTRACT

Methods, systems and non-transitory computer readable media involves receiving information of a new library from a patch management repository. A symbolic link to the new shared library is created and a request to an application process to replace a shared library is communicated. To replace the shared library, the application process periodically checks reference state of the shared library till it reaches a free-state. When the shared library reaches the free-state, the application process unloads the shared library from memory space and loads the new shared library to the memory space. The application process continues performing one or more pre-define functions during the replacement of the shared library.

6 Claims, 4 Drawing Sheets

(56) References Cited

U.S. PATENT DOCUMENTS

| | | | |
|---|---|---|---|
| 2008/0091808 A1* | 4/2008 | Mei | H04L 67/025 |
| | | | 709/223 |
| 2008/0201703 A1* | 8/2008 | Lerum | G06F 8/60 |
| | | | 717/172 |
| 2009/0138870 A1* | 5/2009 | Shahindoust | G06F 8/65 |
| | | | 717/172 |
| 2009/0144728 A1* | 6/2009 | Felts | G06F 8/60 |
| | | | 717/175 |
| 2009/0259999 A1 | 10/2009 | Srinivasan | |
| 2014/0229921 A1* | 8/2014 | Arora | G06F 11/3636 |
| | | | 717/125 |
| 2015/0169329 A1 | 6/2015 | Barrat et al. | |
| 2017/0039061 A1 | 2/2017 | Mavinakayanahalli et al. | |
| 2018/0217851 A1* | 8/2018 | Sirajuddin | G06F 9/44521 |

\* cited by examiner

SYSTEM AND METHOD FOR SEAMLESSLY PATCHING SHARED LIBRARIES IN SERVER ENVIRONMENT

This application claims the benefit of Indian Patent Application Serial No. 201841004315, filed Feb. 5, 2018, which is hereby incorporated by reference in its entirety.

FIELD

This technology generally relates to updating a computing system and, in particular, relates to a method and a system for seamlessly patching shared libraries of the computing system.

BACKGROUND

Client—Server architecture is one of the network architectures that world is using widely, be it a domestic network or a global network. In the client server network architecture, the server may be capable of catering requests of clients from different geographical locations. In case of a vast network, where millions of people are connected to server through their client machines, the server may be running all the time.

In an Enterprise server, scalability and availability are the critical parameters. Server architectures cater this by managing multiple server instances. Each of the server instances are capable of executing the required/pre-defined functionalities, and may be configured to render a same result. The server instances load one or more core libraries (for e.g. shared libraries in Linux) for its execution.

When there is an update for the shared libraries, the conventional method is to bring down all the server instances and update the shared libraries. But this method brings down all the services and is time consuming, which is not appreciated. It may also be necessary to check for a suitable time slot when the load is low on the server. Another method is to use extra server nodes to cater the client requests. To deploy extra server nodes, server procurement, CPU/core procurement, memory requirement, networking infrastructure, licensing, maintenance cost, etc. may be necessary. But, in banks/organizations operating with economic constraints, deploying a new node involving large procurements and/or subscriptions for an alternate or extra nodes for ensuring continuity of service, may not be possible.

So, there is a need for a system which updates the shared libraries by overcoming the above mentioned problems.

SUMMARY

Disclosed are a method, a system and/or a non-transitory computer readable storage medium for seamlessly patching shared libraries.

In one aspect, a computer implemented method for seamlessly patching shared libraries is disclosed. The method involves receiving by a computing device, information of a new shared library from a patch management repository. The computing device creates a symbolic link to the new shared library. The computing device communicates a request to an application process to replace a shared library which is being executed by the application process. The new shared library may be an updated version of the shared library. The application process replaces the shared library with the new shared library.

To replace the shared library, the application process periodically checks reference state of the shared library, till the shared library reaches a free-state. The shared library may reach the free-state when no functions of the shared library are being executed by the application process. When the shared library reaches the free-state, the application process unloads the shared library from memory space and loads the new shared library to the memory space. The application process may continue performing one or more predefine functions during the replacement of the shared library.

In another aspect, a system for seamlessly patching shared libraries is disclosed. The system comprises a patch management repository, a server configured to execute a broadcast process and one or more application processes, wherein the patch management repository and the server are communicatively coupled over a computer network.

The one or more processors associated with the server are configured to run the broadcast process and an application process. The broadcast process receives information of a new library from a patch management repository and creates a symbolic link to the new shared library. The broadcast process communicates a request to an application process to replace a shared library which is being executed by the application process. The new shared library may be an updated version of the shared library. The application process replaces the shared library with the new shared library.

To replace the shared library, the application process periodically checks reference state of the shared library, till the shared library reaches a free-state. The shared library may reach the free-state when no functions of the shared library are being executed by the application process. When the shared library reaches the free-state, the application process unloads the shared library from memory space and loads the new shared library to the memory space. The application process may continue performing one or more predefine functions during the replacement of the shared library.

In yet another aspect, a non-transitory computer readable storage medium for seamlessly patching shared libraries is disclosed. The computer readable storage medium stores computer executable instructions to execute a broadcast process and an application process. The broadcast process receives information of a new library from a patch management repository and creates a symbolic link to the new shared library. The broadcast process communicates a request to an application process to replace a shared library which is being executed by the application process. The new shared library may be an updated version of the shared library. The application process replaces the shared library with the new shared library.

To replace the shared library, the application process periodically checks reference state of the shared library, till the shared library reaches a free-state. The shared library may reach the free-state when no functions of the shared library are being executed by the application process. When the shared library reaches the free-state, the application process unloads the shared library from memory space and loads the new shared library to the memory space. The application process may continue performing one or more predefine functions during the replacement of the shared library.

The method, the system and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system for seamlessly patching shared library. Although the present embodiments have been described with reference to specific exemplary embodiments, it will be evident that various modifications and changes may be made to these embodiments without departing from the broader spirit and scope of the various embodiments.

Exemplary embodiments of the present disclosure provide a method and 'or a system for seamlessly patching shared libraries. The method may involve receiving by a broadcast process, information of a new library from a patch management repository. The broadcast process may create a symbolic link to the new shared library. The broadcast process may communicate a request to an application process to replace a shared library which is being executed by the application process. The new shared library may be an updated version of the shared library. The application process may replace the shared library with the new shared library.

To replace the shared library, the application process periodically checks reference state of the shared library, till the shared library reaches a free-state. The shared library may reach the free-state when no functions of the shared library are being executed by the application process. When the shared library reaches the free-state, the application process may unload the shared library from memory space and load the new shared library to the memory space. The application process may continue performing one or more predefine functions during the replacement of the shared library.

Figure 1:
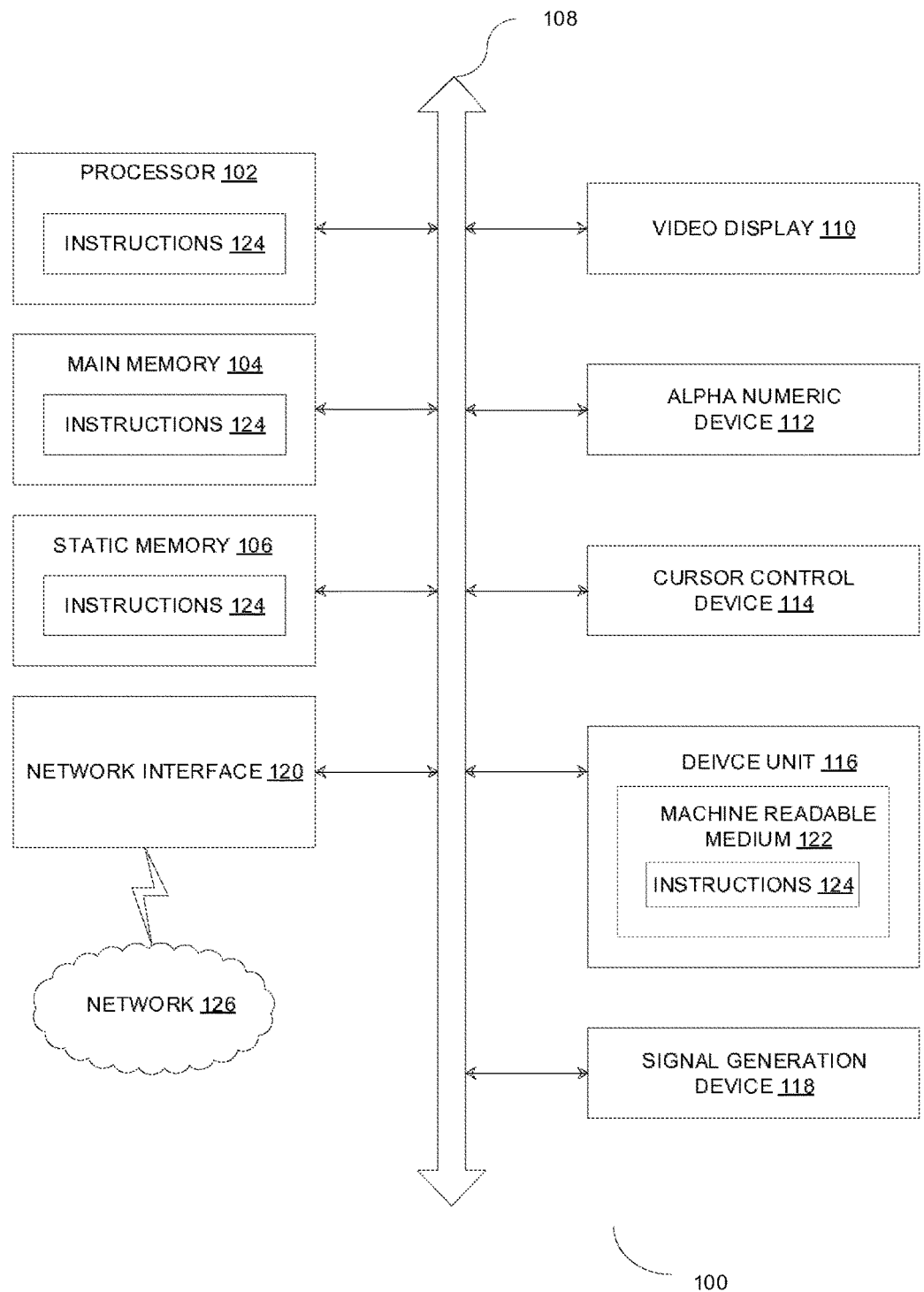
FIG. 1 is a diagrammatic representation of a data processing system capable of processing a set of instructions to perform any one or more of the methodologies herein, according to one or more embodiments.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
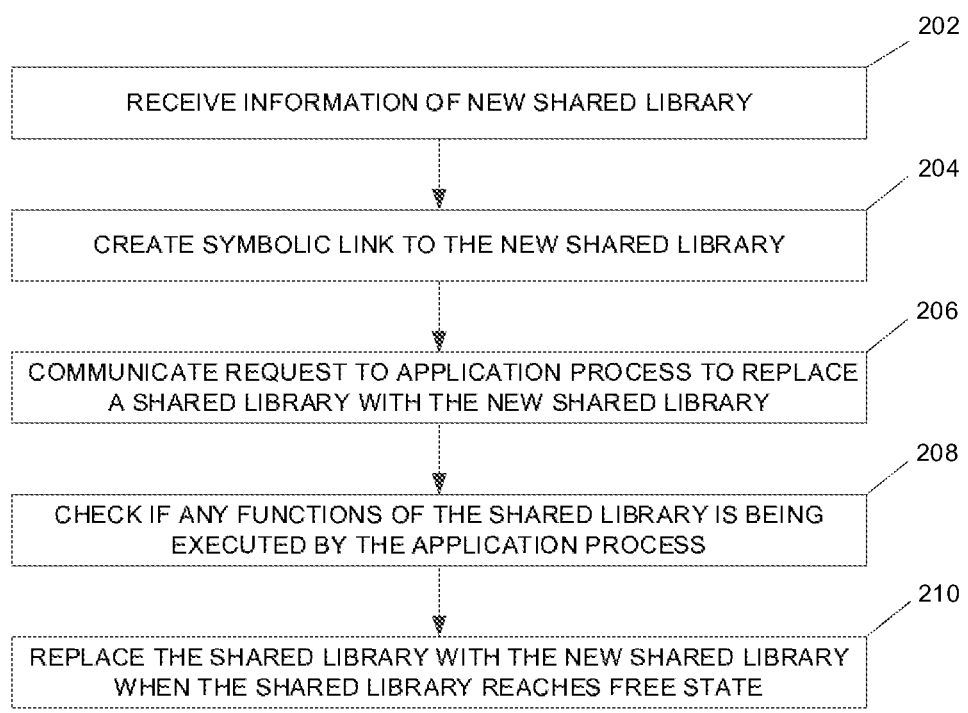
FIG. 2 is a process flow diagram illustrating seamless patching of shared libraries, according to one or more embodiments.

FIG. 2 is a process flow diagram illustrating seamless patching of shared libraries, according to one or more embodiments. A shared library, which is a well-known term in the art, is a file containing one or more computer readable instructions, accessed simultaneously by plurality of processes of a computing system. During the execution of the plurality of processes, each of the plurality of processes may load the shared library into its memory space.

In one or more embodiments, a broadcast process and an application process may be running in a server environment. The broadcast process may receive information of a new shared library from a patch management repository, as in step 202. The information may comprise one or more details of the shared library such as, but not limited to, name of the new shared library, address of the functions mounted, and address of one or more static variables. The new shared library may be an updated version of a shared library which is being executed by an application process. The update may be changes in instructions of the shared library which is being executed, such as addition of functionality, removal of functionality, modification in the instructions and so on. When the broadcast process receives the information, the broadcast process may create a symbolic link to the new shared library, as in step 204.

In one or more embodiments, a symbolic link may be a file which links another file or a directory. The symbolic link may be created by the broadcast process by executing one or more computer readable commands. For example, in Linux™ environment and UNIX® environment, the symbolic link may be created by the broadcast process using 'ln' command. In Windows® environment, the symbolic may be created using 'mklink' command or any other method that is well known in the art.

The broadcast process may further communicate a request to the application process to replace the shared library which is being executed by the application process, with the new shared library, as in step 206. In one or more embodiments, the shared library which is being executed by the application process may also be termed as existing shared library.

In one or more embodiments, the request may comprise at least one of, but not limited to name of the new shared library, the symbolic link created by the broadcast process to the new shared library and any other data required by the application process to carry out the replacement of the existing shared library.

In one or more embodiments, in order to replace the existing shared library with the new shared library, the application process may periodically check reference state of the existing shared library, i.e. whether any functions of the shared library are being executed by the application process, as in step 208. The application process may check reference state of the existing shared library, periodically, till the existing shared library reaches a free-state.

In one or more embodiments, a shared library may said to be in active state when the functions of the shared library are being executed by one or more processes. A shared library may said to be in free-state when none of the functions are being executed by one or more processes.

When the existing shared library reaches the free-state, the application process may replace the existing shared library with the new shared library by unloading the existing shared library from memory space and by loading the new shared library to the memory space, as in step 210. To load the new shared library, the application process may fetch the new shared library using the symbolic link created and communicated by the broadcast process. During the replacement of the existing shared library, the application process may continue performing one or more pre-defined functions.

Figure 3:
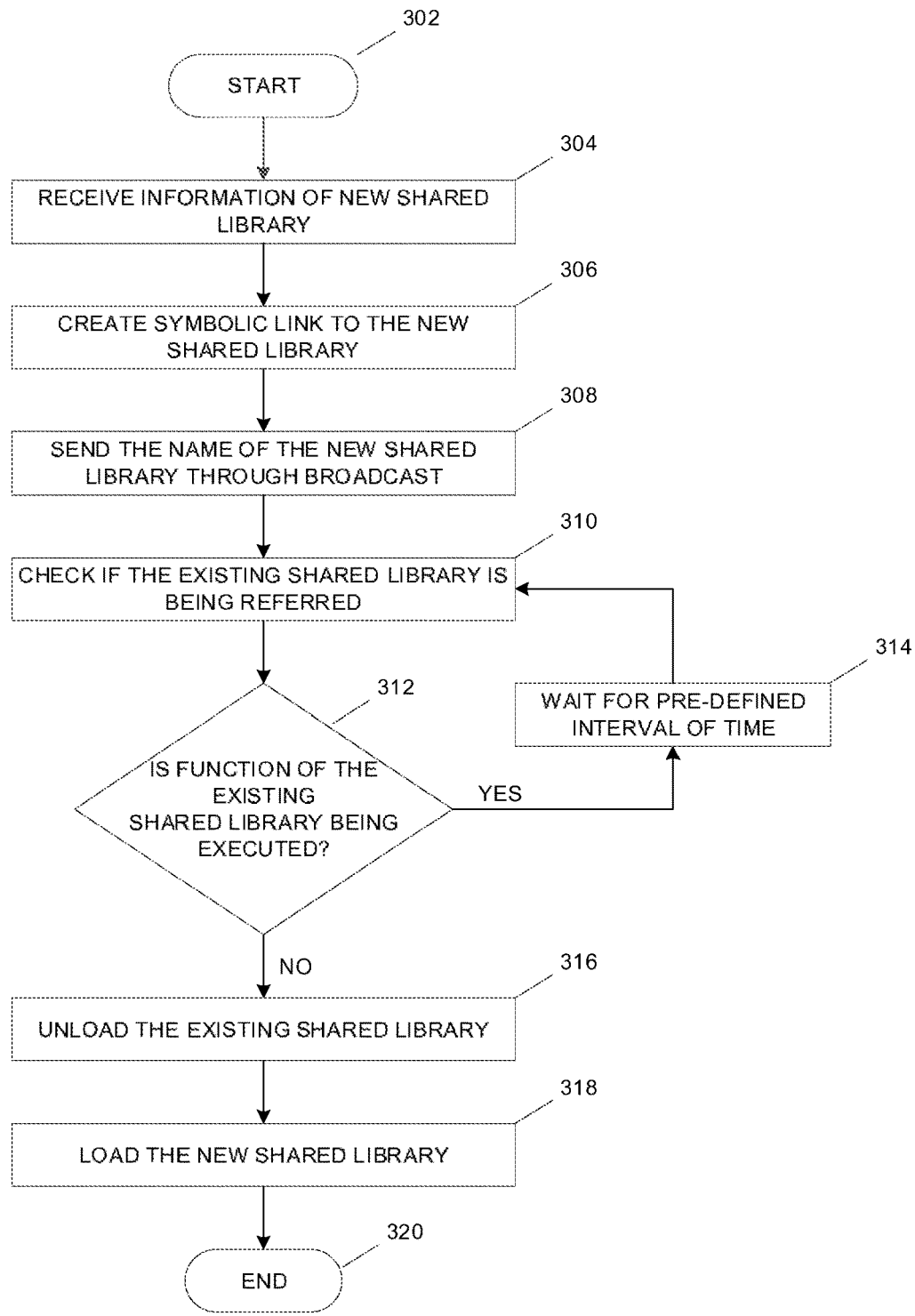
FIG. 3 is a flowchart illustrating steps performed for seamlessly patching shared libraries, according to one or more embodiments.

FIG. 3 is a flowchart illustrating steps performed for seamlessly patching shared library, according to one or more embodiments.

In one or more embodiments, steps for seamlessly patching shared library may be started (302) with a broadcast process receiving information of a new shared library from a patch management repository, as in step 304. The information may comprise one or more details of the shared library such as, but not limited to name of the new shared library, address of the functions mounted, and address of one or more static variables.

In one or more embodiments, the broadcast process may create a symbolic link to the new shared library, as in step 306. The symbolic link may be a file which links another file or a directory. The symbolic link may be created by the broadcast process by executing one or more computer readable commands. For example, in Linux™ environment and UNIX® environment, the symbolic link may be created by the broadcast process using 'ln' command. In Windows® environment, the symbolic may be created using 'mklink' command or any other method that is well known in the art.

In one or more embodiments, the new shared library may be an updated version of a shared library which is being executed by an application process. The update may be changes in instructions of the existing shared library such as addition of functionality, removal of functionality, modification in the instructions and so on. In one or more embodiments, the shared library which is being executed by the application process may also be termed as existing shared library.

Further, the broadcast process may communicate a request to the application process to replace the existing shared library, as in step 308. In one or more embodiments, the request may comprise at least one of, but not limited to name of the new shared library, symbolic link created by the broadcast process to the new shared library and any other data required by the application process to carry out the replacement of the existing shared library.

In one or more embodiments, the application process may check whether the existing shared library is being referred by itself, as in step 310. The application process may refer the existing shared library when the application process accesses executes the one or more functions of the existing shared library.

In one or more embodiments, a shared library may said to be in active state when the one or more functions of the shared library are being executed by one or more processes. A shared library may said to be in free-state when none of the functions are being executed by one or more processes.

In one or more embodiments, if one or more functions of the existing shared library are being executed by the application process, as in step 312, the application process may wait for predefined interval of time, as in step 314 and may check the state of the existing shared library as in step 310, after the pre-defined interval of time. If the existing shared library is found to be in the active state, the application process may repeat the steps 310, 312 and 314 till the shared library reaches the free-state. When the existing shared library reaches the free-state, the application process may unload the existing shared library from memory space, as in step 316, and may load the new shared library in the memory space, as in steps 318 and 320. To load the new shared library, the application process may fetch the new shared library using the symbolic link created and communicated by the broadcast process. During the replacement of the existing shared library, the one or more application process may continue performing one or more pre-defined functions.

Figure 4:
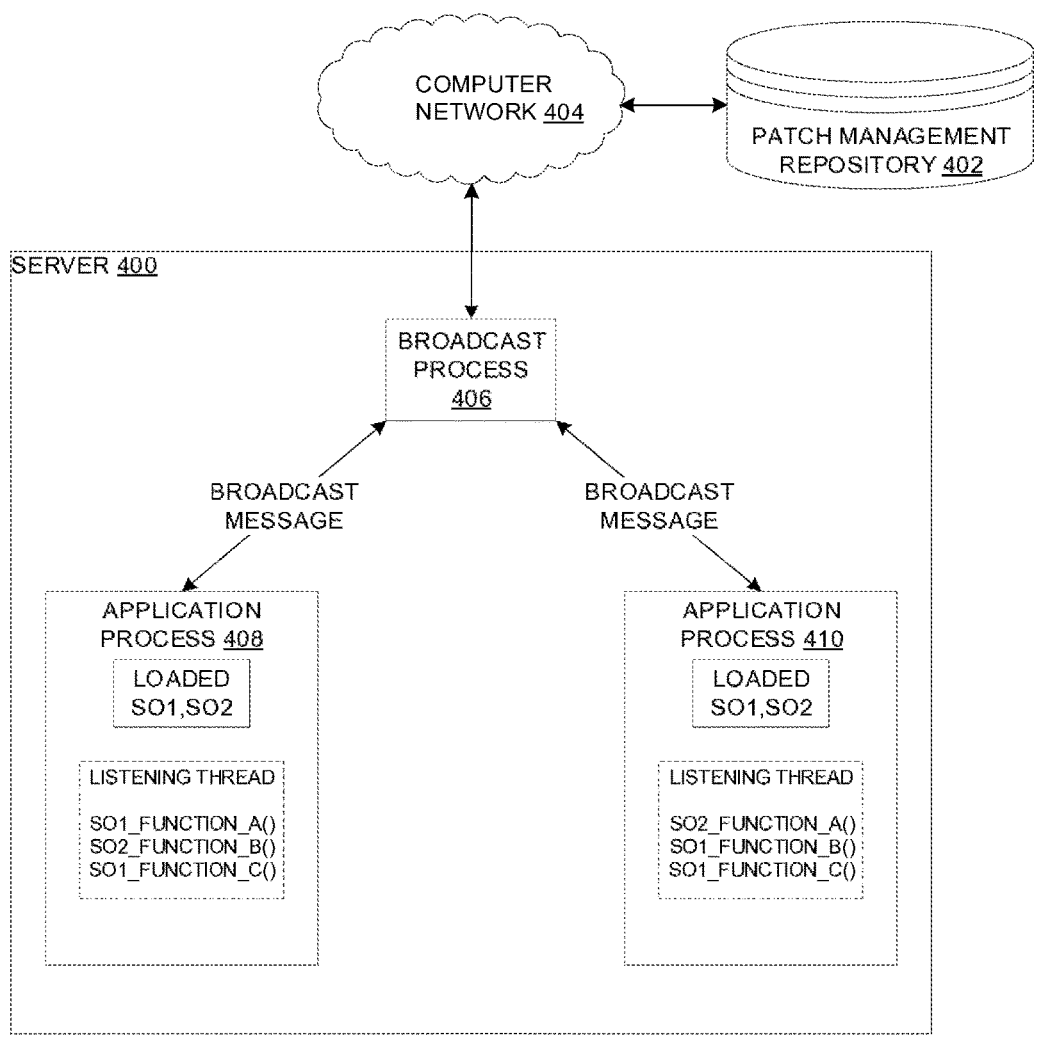
FIG. 4 is an architecture diagram, illustrating different components of a system for seamlessly patching shared libraries, according to one or more embodiments.

FIG. 4 is an architecture diagram of system, illustrating different components of a system for seamlessly patching shared library, according to one or more embodiments. In one or more embodiments, the system for seamlessly patching shared libraries may comprise a server 400, communicatively coupled to a patch management repository 402 over a computer network 404. The server may be configured to run a broadcast process 406 and one or more application process. The one or more application processes may be used to cater the client requests that are received by the server 400.

In an exemplary embodiment, the one or more application processes may be application process 408 and application process 410. Further, the application process 408 may have loaded shared object 1 (SO1) and shared object 2 (SO2). Similarly, the application process 410 may have loaded shared object 1 (SO1) and shared object 2 (SO2). In one or more embodiments of the present disclosure, the term 'shared object' can be interchangeably used as 'shared library'.

In one or more exemplary embodiments, function A of SO1, indicated as SO1_FUNCTION_A( ), function C of SO1, indicated as SO1_FUNCTION_C( ) and function B of SO2, indicated as SO2_FUNCTION_B( ) may be executed by the application process 408. Similarly, function A of SO2 indicated as SO2_FUNCTION_A( ), function b of SO1, indicated as SO1_FUNCTION_B( ) and function C of SO1, indicated SO1_FUNCTION_C ( ) may be executed by the application process 410.

In one or more exemplary embodiments, the broadcast process 406 may receive information of a new shared object from the patch management repository 402, over the computer network 404. The information may comprise one or more details of the shared object such as, but not limited to name of the shared object, address of the functions mounted, and address of one or more static variables.

In one or more embodiments, there may be more than one new shared object. One or more processes of a server 400 or one more server instances of the server 400 may use the functionality of the one or more shared objects along with the functionality of one or more processes in itself. For example, one of such functionalities of the one or more processes or the one or more server instances is to access one or more shared objects to cater client requests.

In one embodiment the patch management repository 402 may be configured to trigger a message to a broadcast process 406, indicating that there is a new shared object that has been pushed by developing team to the patch management repository 402. In another embodiment, the broadcast process 406 may periodically check for new shared objects in the patch management repository 402.

In one or more exemplary embodiments, the broadcast process 406 may create a symbolic link to the path of the shared object stored in the patch management repository. The symbolic link may be a file which links another file or a directory. The symbolic link may be created by the broadcast process 406, by executing one or more computer readable commands. The broadcast process 406 may further communicate a hot patch request to the application process 408 and the application process 410, to replace an existing shared object with the new shared object, by sending a broadcast message through, but not limited to User Datagram Protocol (UDP) socket. The broadcast message may comprise information such as, but not limited to name of the new shared object, symbolic link created by the broadcast process and other information necessary for the application process 408 and the application process 410 to replace the existing shared object. In one or more embodiments, the existing shared object may be one or more shared objects in an active state.

In one or more embodiments, an active state may indicate that the one or more shared objects are being executed by one or more processes. A free-state may indicate that one or more shared object are not being executed by one or more processes. In other way, functions of one or more shared objects are not being referred by one or more processes.

In one or more exemplary embodiments, the application process 408 and the application process 410 may receive the broadcast message and may identify the shared object to be replaced with the new shared object, based on the broadcast message received from the broadcast process 406.

As indicated the FIG. 4, the application process 408 and the application process 410 are using the shared objects S01 and S02 in shared manner. For example, let the new shared object is S01' and the existing shared object is S01. The application process 408 may check for the release of S01. When the application process 408 is still using any of the functions of S01, then the application process 408 may periodically check the reference state of S01, till the S01 reaches the free-state. When the S01 reaches the free-state, i.e., the application process 408 is not accessing function A and function C of S01, the application process 408 may unload the shared object S01 and load the new shared object S01. In order to load the new shared object S01, the application process 408 may fetch the new shared object S01 using the symbolic link created and communicated by the broadcast process 406. During the replacement of S01, the application process 408 continues to access other shared objects so that the application process 408 may seamlessly update the shared object and cater the other client requests simultaneously. In the present example, the application process 408 continues executing the shared object S02.

In another example embodiment, the application process 410 may update the shared object, similar to the application process 408. The application process 410 may check for the release of S01. When the application process 410 is still using any of the functions of S01, then the application process 410 may periodically check the reference state of the shared object S01 till the shared object S01 reaches the free-state. When the shared object S01 reaches the free-state, i.e., the application process is not accessing function B and function C of S01, the application process 410 may unload the shared object S01' and load the new shared object S01. During the replacement of S01, the application process 410 continues to access other shared objects, such as, but not limited to S02.

In one or more embodiments, if a broadcast process requests an application process to replace one or more shared libraries, and each of the one or more shared libraries are in a free state, the application process may update each of the one or more shared libraries in sequence or simultaneously. For example, if the application process receives request to update S01 and S02, then the application process may replace S01 and S02 in sequence or may replace S01 and S02 simultaneously.

In one or more embodiments, the broadcast process may send a broadcast message one or more application processes so that each of the one or more application processes update the shared object, when the shared objects accessed by each of the one or more application process reaches free state.

In one or more embodiments, if the shared object for which there is no update, the application process may continue executing the shared objects without replacing them.

In one or more embodiments, if the shared object for which there is an update, and the shared object is not being executed, the shared object may be updated by the application process.

In one or more embodiments, a system for seamlessly patching one or more shared objects, may comprise a Listener and Monitor Service (LIMO) Client, Listener and Monitor Service (LIMO) server, Multiple Asynchronous Request Interface Adapter (MARIA) and one or more client devices. The one or more client devices may be, but not limited to an Automated Teller Machine (ATM) clients, branch teller clients and/or end of the day batch clients.

In one or more embodiments, the one or more client devices may be connected to the server 400 through a LIMO client library over a computer network. The LIMO client library may establish and maintain Transmission Control Protocol (TCP) connectivity with the LIMO server through one or more ports listening at the endpoint of server called MARIA port. One or more raw messages sent from the one or more client devices via the LIMO client library may be encrypted using Advanced Encryption Standards (AES) and serialized using an internal proprietary protocols.

In one or more embodiments, the MARIA may receive requests from one or more client devices through a TCP port exposed to the one or more client devices. The one or more client devices may connect and send messages to the server 400 via the MARIA. The MARIA may be further connected to one or more server instances, called to forward the messages for processing. The MARIA may serve as an adapter to the messages from the one or more client devices to processing units of the server 400. The MARIA may authenticate the TCP connections using Secured Sockets Layer (SSL) handshake.

In one or more embodiments, requests from the one or more client devices may be distributed among the one or more server instances, also referred as application process. Each of the one or more server instances may execute a business logic by loading one or more business libraries or shared libraries also referred as shared objects. To update any of the shared libraries, and to eliminate the need of bringing the server down and restart the server, and to eliminate the need of external process to update the shared libraries, the present disclosure provides a method, a system and/or a non-transitory computer readable storage medium for seamlessly patching shared libraries. The steps may involve receiving by a broadcast process, information of a new library from a patch management repository. The information may comprise one or more details of the shared library such as, but not limited to name of the shared library, address of the functions mounted, and address of one or more static variables. The broadcast process may create a symbolic link to the new shared library. The broadcast process may communicate a request to an application process to replace a shared library which is being executed by the application process. The new library may be an updated version of the shared library. The application process may replace the shared library with the new shared library.

To replace the shared library, the application process may periodically check reference state of the shared library, till the shared library reaches a free-state. The shared library may reach the free-state when no functions of the shared library are being executed by the application process. When the shared library reaches the free-state, the application process may unload the shared library from memory space and load the new shared library to the memory space. The application process may continue performing one or more predefine functions during the replacement of the shared library.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method for seamlessly patching a shared library, comprising:
   receiving, by a computing device, information of a new shared library from a patch management repository;
   communicating, by the computing device, a request to an application process to replace an existing shared library loaded in memory space, wherein the new shared library is an updated version of the existing shared library; and
   replacing the existing shared library with the new shared library, wherein during the replacing of the existing shared library the application process simultaneously continues to cater to one or more other requests to access another shared library loaded in the memory space and wherein the replacing of the existing shared library comprises:
   checking a reference state of the existing shared library periodically until the existing shared library reaches a free state;
   unloading the existing shared library from the memory space when the existing shared library reaches the free state; and
   loading the new shared library to the memory space.

2. The method of claim 1, wherein the shared library reaches a free-state when no function of the shared library is being executed by the application process.

3. A system for seamlessly patching shared library, comprising:
   a computer network;
   at least one processor; and
   at least one memory unit operatively coupled to the at least one processor over the computer network and having instructions stored thereon that, when executed by the at least one processor, causes the at least one processor to:

receive information of a new shared library from a patch management repository;

communicate a request to an application process to replace an existing shared library loaded in memory space, wherein the new shared library is an updated version of the existing shared library; and replace the existing shared library with the new shared library, wherein during the replace the existing shared library the application process simultaneously continues to cater to one or more other requests to access another shared library loaded in the memory space and wherein the replace the shared library comprises:

check a reference state of the existing shared library periodically until the existing shared library reaches a free state;

unload the existing shared library from the memory space when the existing shared library reaches the free state; and load the new shared library to the memory space.

4. The system of claim 3, wherein the shared library reaches a free-state when no function of the shared library is being executed by the application process.

5. A non-transitory computer-readable medium storing computer-readable instructions that, when executed by one or more computing devices, cause at least one of the one or more computing devices to:

receive information of a new shared library from a patch management repository;

communicate a request to an application process to replace an existing shared library loaded in memory space, wherein the new shared library is an updated version of the existing shared library; and replace the existing shared library with the new shared library, wherein during the replace the existing shared library the application process simultaneously continues to cater to one or more other requests to access another shared library loaded in the memory space and wherein the replace the shared library comprises:

check a reference state of the existing shared library, periodically until the existing shared library reaches a free state;

unload the existing shared library from the memory space when the existing shared library reaches the free state; and load the new shared library to the memory space.

6. The non-transitory computer readable medium of claim 5, wherein the shared library reaches a free-state when no function of the shared library is being executed by the application process.

\* \* \* \* \*